United States Patent
Minich et al.

(10) Patent No.: US 6,474,410 B1
(45) Date of Patent: Nov. 5, 2002

(54) ELECTRONICS HOUSING

(76) Inventors: John A. Minich, 142 Pennock Trace Dr., Jupiter, FL (US) 33458; Diane P. Minich, 142 Pennock Trace Dr., Jupiter, FL (US) 33458

( * ) Notice: Subject to any disclaimer, the term of this patent is extended or adjusted under 35 U.S.C. 154(b) by 0 days.

(21) Appl. No.: 09/685,993

(22) Filed: Oct. 10, 2000

(51) Int. Cl.$^7$ ............................................. F28D 15/00
(52) U.S. Cl. ................................. 165/104.33; 316/691
(58) Field of Search .................... 454/184; 312/236, 312/7.2, 114; 55/385.2, 385.6, 467, 467.1; 361/695, 691; 165/104.33, 108

(56) References Cited

U.S. PATENT DOCUMENTS

| | | | | |
|---|---|---|---|---|
| 3,987,258 A | * | 10/1976 | Tsutsui et al. | ............... 181/149 |
| 4,678,246 A | * | 7/1987 | Ytter | ........................... 312/114 |
| 4,784,675 A | * | 11/1988 | Leber et al. | |
| 4,800,238 A | | 1/1989 | Gesvent | |
| 4,817,191 A | | 3/1989 | Adams | |
| 4,920,458 A | * | 4/1990 | Jones | ....................... 312/7.2 X |
| 5,160,357 A | * | 11/1992 | Faber | ..................... 55/385.6 X |
| 5,163,870 A | * | 11/1992 | Cooper | ........................ 454/184 |
| 5,235,822 A | | 8/1993 | Leonovich, Jr. | |
| 5,401,092 A | * | 3/1995 | Ady | ........................ 312/236 X |
| 5,447,041 A | | 9/1995 | Piechota | |
| 5,475,562 A | * | 12/1995 | Gow | ........................... 361/695 |
| 5,657,641 A | * | 8/1997 | Cunningham et al. | .. 361/691 X |
| 6,104,003 A | * | 8/2000 | Jones | ..................... 321/236 X |
| 6,105,875 A | * | 8/2000 | LaGrotta et al. | |

FOREIGN PATENT DOCUMENTS

JP        6-268388    *   9/1994

* cited by examiner

Primary Examiner—Harold Joyce
(74) Attorney, Agent, or Firm—McHale & Slavin

(57) ABSTRACT

A portable, sealed apparatus for housing electronic devices for outside use having slidable shelves for housing a TV, VCR, DVD, stereo, etc. The shelves are behind water and ozone proof doors. The doors have transparent areas for viewing the TV and operating remote controls. The inside of the apparatus is cooled by a fan controlled by a thermostat. The fan draws hot air over cooling fins that extend through the side to the outside. A grill and filter allow for removal of lint and dust. The electronic devices may be plugged into a power strip and run on a battery or by an external electrical source. The apparatus may have an optional humidification control device or heater. The apparatus is on lockable wheels and has handles that permit the easy movement of the electronic devices to the desired area.

12 Claims, 2 Drawing Sheets

ELECTRONICS HOUSING

FIELD OF THE INVENTION

This invention relates generally to the use of electronics outdoors and more particularly to a portable housing that permits the use of conventional electronic devices in adverse outdoor conditions.

BACKGROUND OF THE INVENTION

It is often desirable to use conventional electronic devices outdoors. Outdoor entertainment may include the use of a television on a patio to watch ballgames or special events. A video playback device may be used to, playback DVD's, VCR tapes and the like. Similarly, a stereo may be used to play music wherein the stereo may include tapes and compact discs.

A problem occurs when the consumer employs such conventional electronic devices in an area that is adverse to the normal operation. The use of a conventional television set, a set designed for indoor use only, in an outdoor setting poses a risk to the consumer. For instance, should a television set be placed near a pool, even an errant splash of water may irreparably damage the delicate electronics. Rain water, high humidity, even a spilled drink may not only ruin the television, it may result in electrocution of those who contact the device. Unfortunately, such situations occur quite frequently as the consuming public becomes more comfortable with electrical items that are "insulated" or look "rugged" enough to work outdoors.

NEMA has set forth standards for electrical items that are used outdoors. Such standards call for splash or even water proof enclosures with special sealing gaskets. However, such specialty enclosures can make the electronic device prohibitively expensive. For instance, a television manufactured for use outdoors may cost ten times the amount of a comparative indoor television. Further, the enclosure may lack the quality found in a mass produced, mass testing electronic device. The instant invention meets or exceeds NEMA 4× standards.

Prior art devices are known which house lower cost items for outdoor use such as built-in audio systems used in insulated coolers; U.S. Pat. Nos. 5,447,041; 4,817,191; and 5,235,822. However, such audio systems do not provide an interchangablity of components.

U.S. Pat. No. 4,800,328 discloses a housing for electrical components that has a sealable trap door. However, the invention is focused on sealing requirements of the access door and not to the housing unit itself.

Thus, what is lacking in the art is an outdoor electronics housing that accepts conventional indoor devices.

SUMMARY OF THE INVENTION

In general the instant invention is a sealed, portable apparatus for housing electronic devices for outdoor use. The apparatus has four sides, a top, and a bottom. The front side has an upper door with an inside shelf for holding a TV or the like display monitor. The door has a transparent viewing screen and optional, removable, and interchangeable cover screens. Such screens are illustrated by, but not limited to tinted screens useful for reducing glare, and may further include optical filtering means effective for enhanced viewing.

The front side also has a lower door with a transparent area and a waterproof speaker on either side of the door. The lower shelf can hold a VCR, stereo, DVD, cable box, satellite TV, etc. The transparent areas allow the viewer to operate the electronic device by remote control.

The doors have internal latches with optional locks and/or hinges and are sealed by using a water and ozone proof seal. Preferably, the water and ozone proof seal is EPDM. However, any other suitable water and ozone proof sealant may be used. Preferably, the apparatus is composed of corrosion and water proof fiberglass such as FRP, however any suitable water and ozone proof material may be used.

The inside of the apparatus has removable, slidable shelves. The shelves can slide partially out of the apparatus to allow the user to easily place a TV, VCR, DVD, Stereo, Video/Audio amplifier, etc. onto the shelf before sliding it back into the apparatus. The apparatus has handles and steerable wheels. The wheels have lockable castors to secure the apparatus for when it is stationary. These features allow inside electronic devices to be easily transported and used outside.

The inside of the apparatus has a cooling means to maintain the internal temperature, for example a cooling fan, air conditioner, or the like. When utilizing a cooling fan, a cooling fin, preferably made of aluminum, is directly above the cooling fan and extends outside the apparatus. The fan draws hot air across the fins and then outside, thus no vent is needed. A thermostat controls the cooling fan. Also, the apparatus has a filter and grill to keep the inside free of dust and lint. Optionally, the inside may have a heater or humidity conditioning device. The preferable internal temperature is about 41 to 104 degrees Fahrenheit. The preferable internal humidity is about 10 to 75 percent.

The inside of the apparatus also has a surge protector and a power strip. The electronic devices may be plugged in to the power strip inside the apparatus. The inside of the apparatus also has at least one spring loaded retractable unit for holding electrical cabling, e.g. electrical wire or the like. The rear side has a rear door for electrical coupling. The electrical cord extends outside by an ozone and water proof seal for example, an O ring, grommet or any other suitable ozone and water proof seal. The apparatus may be run by battery power or by an external electrical source. A ground fault interrupter circuit will normally be included, however, such circuit is not required.

Accordingly, it is an objective of the instant invention to provide a hermetically sealed apparatus for housing indoor electronic devices for outdoor use.

It is a further objective of the instant invention to provide a portable apparatus that is easily movable for housing electronic devices.

It is yet another objective of the instant invention to provide completely automated climate control in a weatherproof apparatus for housing electronic devices.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE INVENTION

Figure 1:
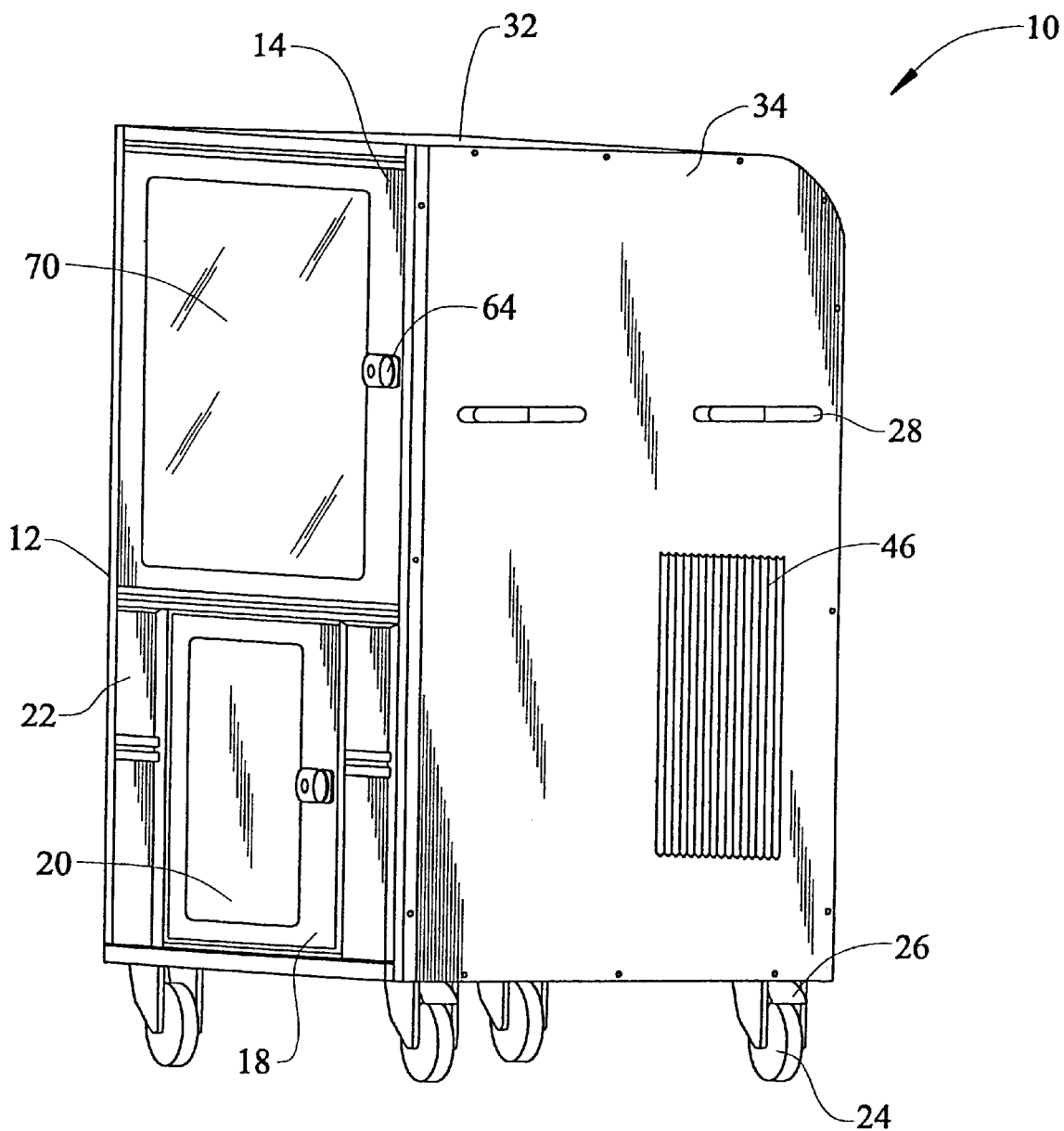
FIG. 1 is an overall view of the apparatus.

Now referring to the Figures, the apparatus 10 is defined by a bottom 50, top 32, a front side 12, a rear side 60, a first side 34 and a second side 36. In the preferred embodiment, the front side 12 has an upper door 14 with a transparent viewing screen 16, a lower door 18 with a transparent area 20, and two waterproof speakers 22. The transparent screen 16 and area 20 permit a viewer to use a remote control.

The apparatus 10 has at least one steerable wheel 24, preferably four, one at each corner, as depicted. The wheels 24 have lockable casters 26 that secure the wheels 24 of the apparatus 10 ensuring that it remains in place while stationary. The apparatus 10 may have at least one handle 28, preferably two as depicted, for movement by the user. Thus, the apparatus 10 can be easily relocated to the desired area.

Figure 2:
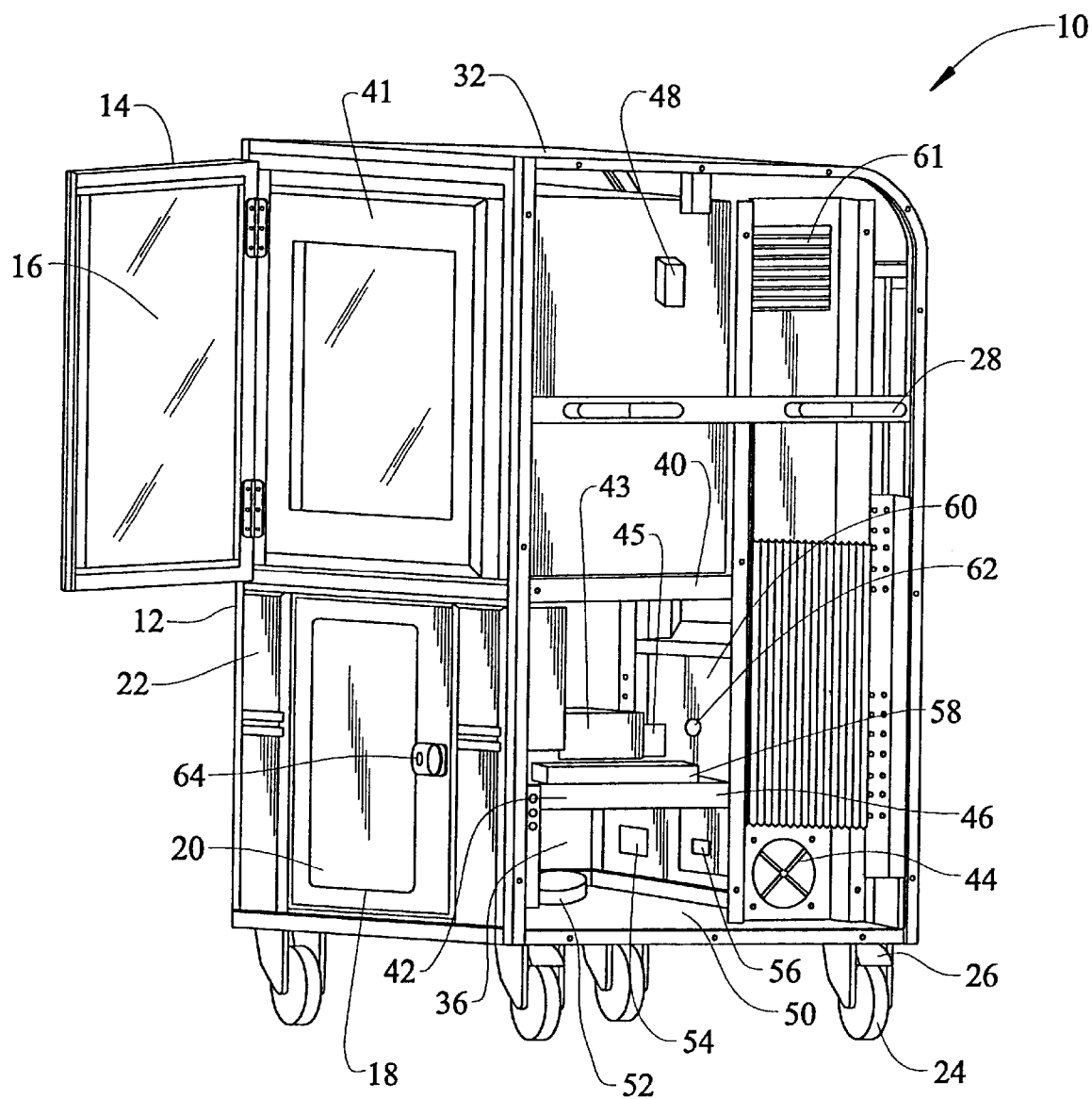
FIG. 2 is a cross-sectional view of the inside of the apparatus.

Now referring to FIG. 2, shown is a cross-sectional view of the apparatus 10 with an inside top shelf 40 and a middle shelf 42. The top shelf 40 may house a TV 41 while the middle shelf 42 may house a VCR, DVD, stereo, etc 43. A speaker amplifier 45 may be included for enhanced audio characteristics. The top shelf 40 and middle shelf 42 may slide out to allow the electronic device to be easily placed onto the shelf. The bottom 50 has a retractable cable storage device 52. The apparatus 10 may have an optional humidification modifying device, e.g. a de-humidifier 54 and internal heater 56. The upper door 14 may have an optional, removable screen 70 that covers the transparent viewing screen 16, for example a tinted screen, optical filtering means or the like, effective for reducing glare.

A cooling device, herein illustrated as (but not limited to) a cooling fan 44 provides circulation that pulls the hot air across the cooling fins 46 and releases it outside. A thermostat 48 controls the internal temperature. The apparatus 10 also has a filter and grill 61 to eliminate lint and dust. the electronic devices. The rear side 60 has at least one sealed outlet 62 for electric cords. The sealed outlet 62 may be an O ring, grommet or any other suitable water and ozone proof seal. The power source may be a battery or an external electrical source. All edges are sealed to preserve the internal temperature and humidity. The doors have internal latches with optional locks and/or hinges 64 and the perimeter has knife edges with a water and ozone proof seal. The internal temperature is preferably about 41 to 104 degrees Fahrenheit and preferably has about 10 to 75 percent humidity. As a result, the housed electronic devices are maintained in an environmentally protected stable climate.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

What is claimed is:

1. A sealed apparatus for housing electronic devices for protection from adverse environmental conditions comprising; a housing defined by a top and bottom with four walls secured thereto forming a hermetically sealed cavity; means for conditioning the environment of said cavity; at least one door having a hermetically sealable perimeter located on one of said walls, said door having at least one transparent viewing screen; and at least one shelf located in said cavity for placement of an electronic device, wherein said electronic device can be viewed through said transparent screen, and at least one waterproof audio speaker integral to said housing which can be electronically coupled to an electronic device within said housing.

2. The apparatus according to claim 1 wherein said means for conditioning said cavity is further defined as a cooling fan mounted within said cavity coupled to a cooling fin located outside said cavity, said cooling fan having a thermostat to operate said fan and a grill and a filter for collecting and removing lint and dust circulated by said fan.

3. The apparatus of claim 1 wherein said cavity includes at least one sealed cable which is retractable.

4. The apparatus of claim 1 wherein said cavity includes a means for humidity conditioning.

5. The apparatus of claim 1 wherein said cavity includes a heater.

6. The apparatus of claim 1 wherein said apparatus is made portable by placement of wheels beneath said housing.

7. The apparatus of claim 6 wherein at least one of said wheels can be locked to prevent rotation.

8. The apparatus of claim 1 wherein said transparent viewing screen includes a removable cover screen.

9. The apparatus of claim 1 wherein said transparent cover screen is effective for glare reduction.

10. The apparatus of claim 1 wherein said housing is constructed of plastic.

11. The apparatus of claim 1 wherein said housing is constructed of fiberglass.

12. The apparatus of claim 1 wherein said walls are constructed of non-corrosive metal.

\* \* \* \* \*